United States Patent [19]
Janko et al.

[11] Patent Number: 5,940,124
[45] Date of Patent: Aug. 17, 1999

[54] ATTENTIONAL MAPS IN OBJECTIVE MEASUREMENT OF VIDEO QUALITY DEGRADATION

[75] Inventors: Bozidar Janko, Portland; John W. Edwards, Lake Oswego, both of Oreg.

[73] Assignee: Tektronix, Inc., Wilsonville, Oreg.

[21] Appl. No.: 08/896,912

[22] Filed: Jul. 18, 1997

[51] Int. Cl.⁶ .......................... H04N 17/00; H04N 17/04
[52] U.S. Cl. .................... 348/189; 348/192; 348/191; 348/180; 348/181; 382/103; 382/104; 382/118; 382/141
[58] Field of Search ..................... 348/180, 181, 348/184, 189, 191; 382/103, 104, 107, 118, 141; H04N 17/00, 17/04

[56] References Cited

U.S. PATENT DOCUMENTS

| | | | |
|---|---|---|---|
| 5,446,492 | 8/1995 | Wolf et al. | 348/192 |
| 5,596,264 | 1/1997 | Wolf et al. | 348/192 |
| 5,757,287 | 5/1998 | Kitamura et al. | 382/104 |
| 5,774,569 | 6/1998 | Waldenmaier | 382/104 |
| 5,818,520 | 10/1998 | Janko et al. | 348/189 |

*Primary Examiner*—John K. Peng
*Assistant Examiner*—Paulos M. Natnael
*Attorney, Agent, or Firm*—Francis I. Gray

[57] ABSTRACT

Attentional maps that reflect the subjective view of an observer to the effects of degradation in a video image are used in the objective measurement of video quality degradation. The observer assists in generating an attentional map for each image of a test image sequence, which provides different thresholds or weighting factors for different areas of each image. A video image sequence from a system under test is compared with the test image sequence, and the error results are displayed as a function of the corresponding attentional maps.

6 Claims, 8 Drawing Sheets

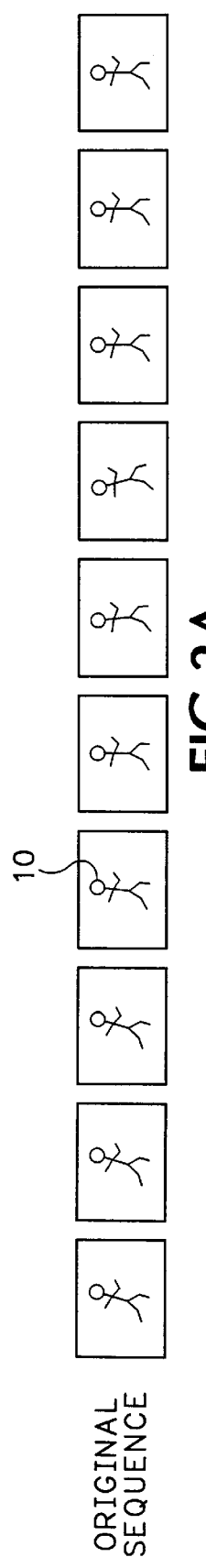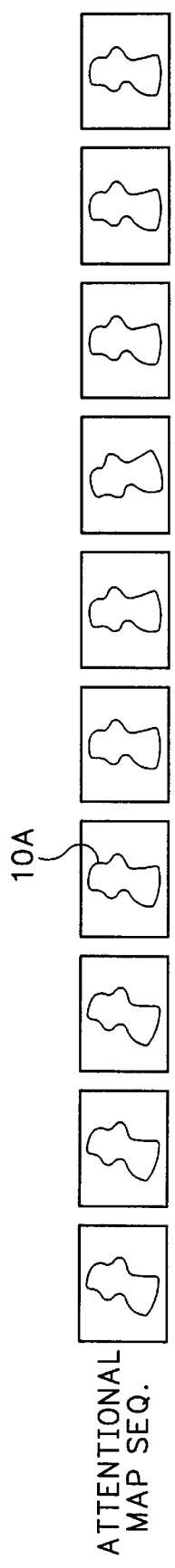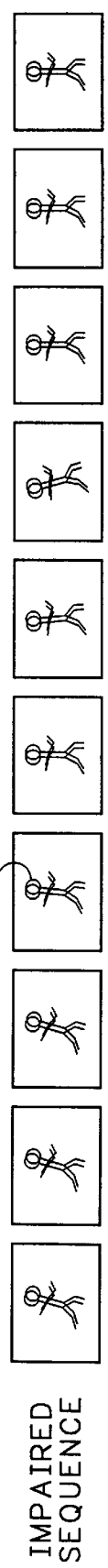

ATTENTIONAL MAPS IN OBJECTIVE MEASUREMENT OF VIDEO QUALITY DEGRADATION

CROSS-REFERENCE TO RELATED APPLICATIONS

Not applicable

STATEMENT REGARDING FEDERALLY SPONSORED RESEARCH OF DEVELOPMENT

Not applicable

BACKGROUND OF THE INVENTION

The present invention relates to the test and measurement of video image signals, and more particularly to attentional maps in the objective measurement of video quality degradation.

Both subjective and objective measurements of video quality degradation in video image signals have been done. In subjective measurements human subjects visually compare and rate the degradation between an original and an impaired video image signal. Objective quality measurements are done by comparing an impaired video image signal to its original video image signal. The comparison includes such processing as transforming video image signals into bit-map form, adjusting mutual amplitude gain, offset and spatial shift, filtering them in some fashion, subtracting them from each other, then filtering some more and representing the results either as error maps or as statistics derived from these maps.

Subjective measurement methods suffer from a lack of reproducibility and consistency. Objective methods are mechanistic and lack the ability to differentiate between areas where human observers pay attention ("attentional factors") and those areas without much interest to humans.

What is desired is a measurement method using attentional aspects in objective measurement of video quality degradation that takes advantage of the benefits of both subjective and objective measurement methods.

BRIEF SUMMARY OF THE INVENTION

Accordingly the present invention provides attentional maps in the objective measurement of video quality degradation. The attentional maps provided weighting values according to the amount of subjective influence each portion of each frame of a test image sequence has on an observer. The test image sequence is then transmitted through a system under test to generate a degraded test image sequence. The degraded test image sequence is compared to the test image sequence according to a selected measurement algorithm with the results being weighted by the corresponding attentional maps. The measurement outputs are provided on an appropriate measurement display.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIGS. 2A, 2B and 2C illustrate a sequence of video frames from a test sequence with associated attentional maps and a corresponding impaired sequence according to the present invention.

DETAILED DESCRIPTION OF THE INVENTION

Figure 1A:
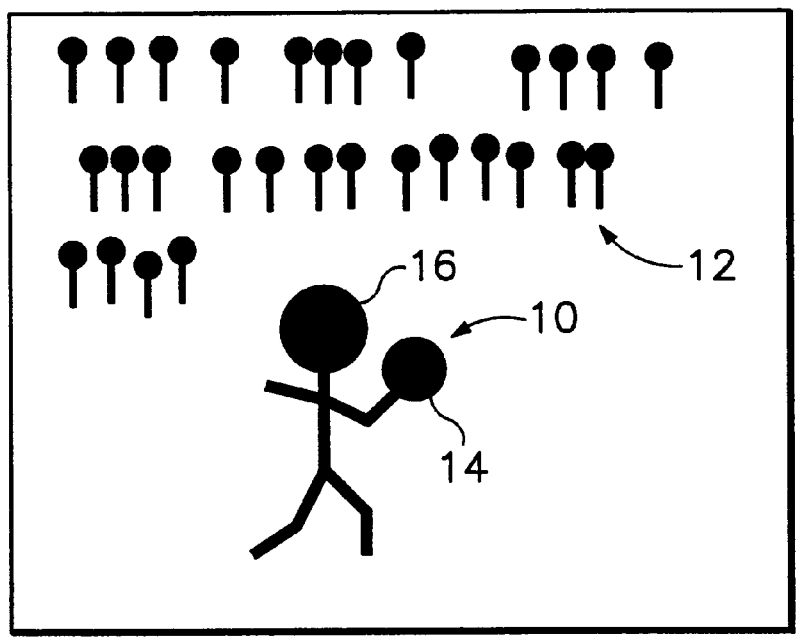
FIGS. 1A and 1B illustrate a frame of video data from a test sequence and an associated attentional map according to the present invention.
Figure 1B:
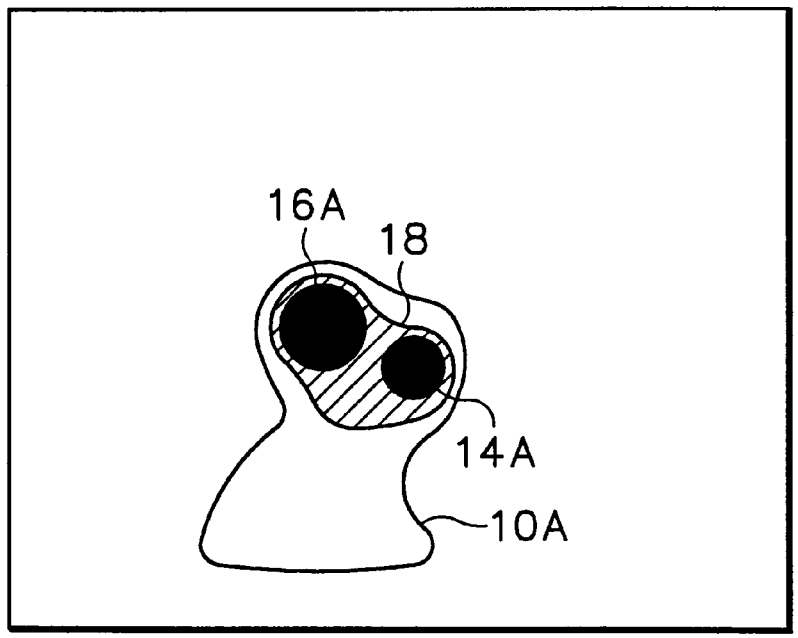

Referring now to FIG. 1A a single frame of a video image sequence is shown, representing a ball player 10 in the foreground against a background of a crowd 12. A human observing the scene would be drawn to watch the ball player 10, and not pay attention to the background crowd 12. Furthermore the human observer would more likely be more attentive to the ball 14 and the player's head 16 than to other parts of the player 10. Therefore an attentional map may be prepared, as shown in FIG. 1B, that concentrates upon the head 16A and the ball 14A and the immediately surrounding area 18, as well as the player 10A as a whole, in that order of importance. Similar attentional maps may be prepared for each image of the sequence, as shown in FIGS. 2A and 2B. FIG. 2C shows a corresponding impaired sequence where the player 10B is degraded in the image in such a manner as to be subjectively objectionable to a human observer, i.e., the player appears to have a shadow or be blurred.

The present invention is based on a paradigm where a known test sequence is transmitted through a path, which path often involves video data compression and decompression. The test sequence of FIG. 2A may be either natural or artificial. Going through the path the sequence becomes impaired, as shown in FIG. 2C. The impaired sequence may be captured on a test instrument, such as that shown in FIG. 3, which instrument performs objective measurements by comparing the captured impaired sequence with the original test sequence.

Figure 3:
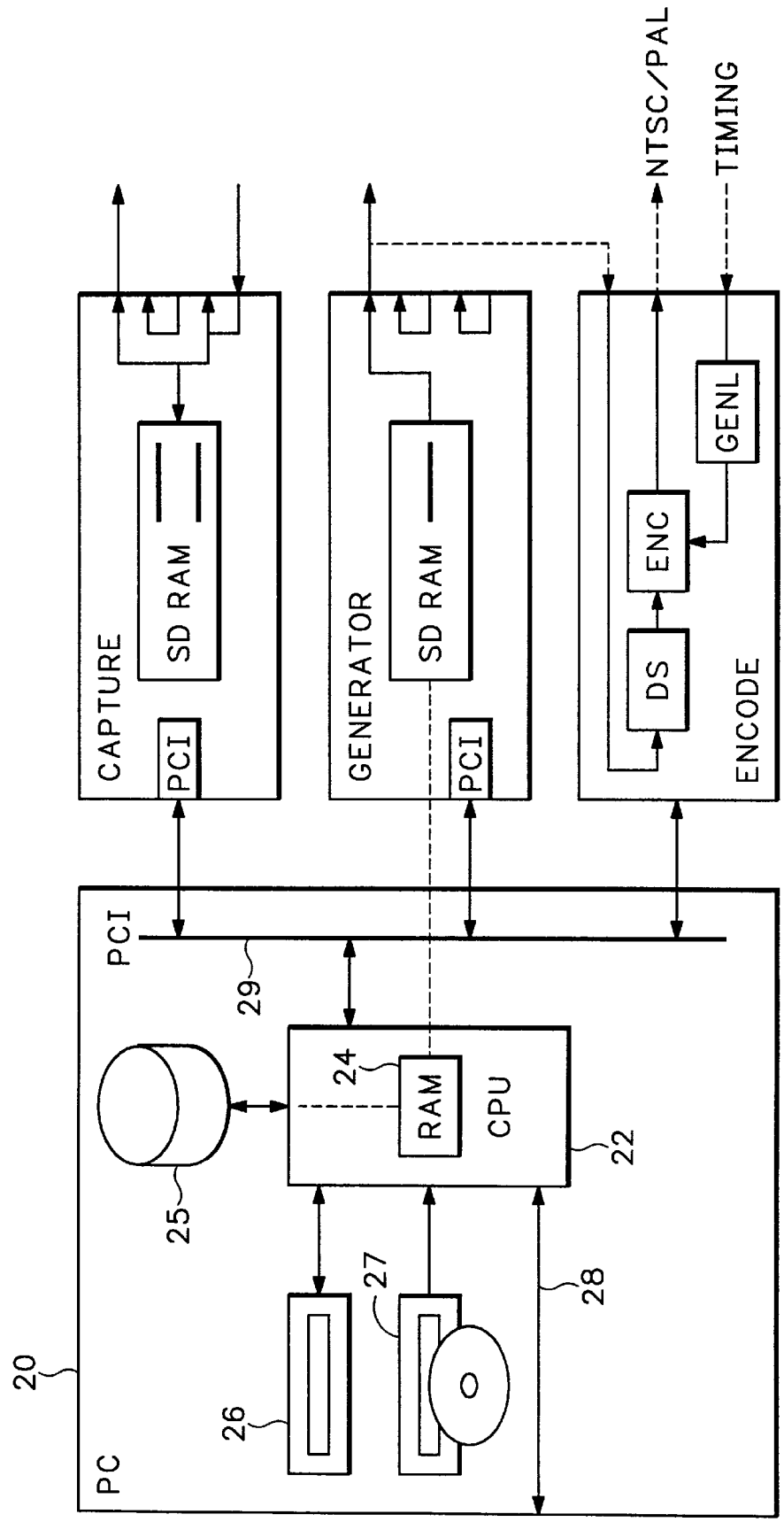
FIG. 3 is a block diagram view of a test instrument for objectively measuring video signal degradation using attentional maps according to the present invention.

The instrument shown in FIG. 3, which is one way of applying the present invention, may be implemented on a personal computer 20 or other computational platform that includes a computer processing unit (CPU) 22 with associated random access memory (RAM) 24 and various input/output interfaces, such as a disc drive 25, a floppy drive 26, a CD-ROM drive 27 and an interface 28 to external devices such as a mouse, a keyboard and/or a touch screen. The PC 20 communicates with other PC cards via a PC interface bus 29. Such PC cards may include a capture card 30, a test sequence generator card 40, an encoder card 50 and/or a decoder card 60.

Figure 4:
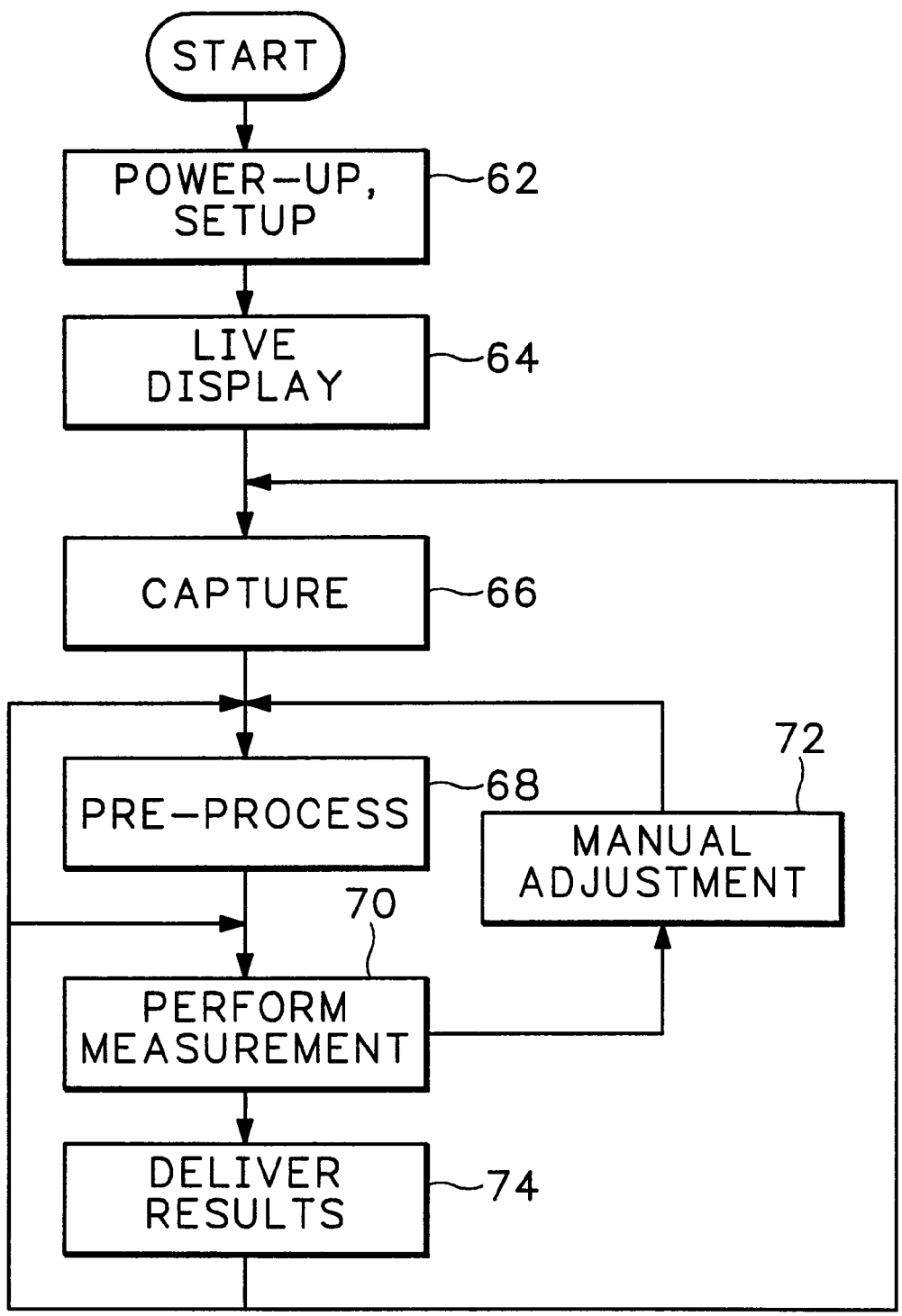
FIG. 4 is a flow chart diagram view of an overall measurement processing flow according to the present invention.

The overall measurement flow through the instrument of FIG. 3 is shown in FIG. 4. At power-up of the instrument appropriate setup is performed in step 62 according to the desired measurement. A live display is provided from the input video at step 64. The portion of the input video that is the desired frame or frames of the test sequence from the input video are captured at step 66. The captured frame(s) is preprocessed at step 68 and then measured against a corresponding reference frame(s) at step 70. Step 72 provides for manual feedback to the preprocessing step to obtain a meaningful measurement value. The measurement is then displayed or otherwise made available at step 74. If there is more than one frame, then the measurement of step 70 is performed for the next frame, otherwise loop back to the preprocessing step for the next captured frame(s).

Figure 5:
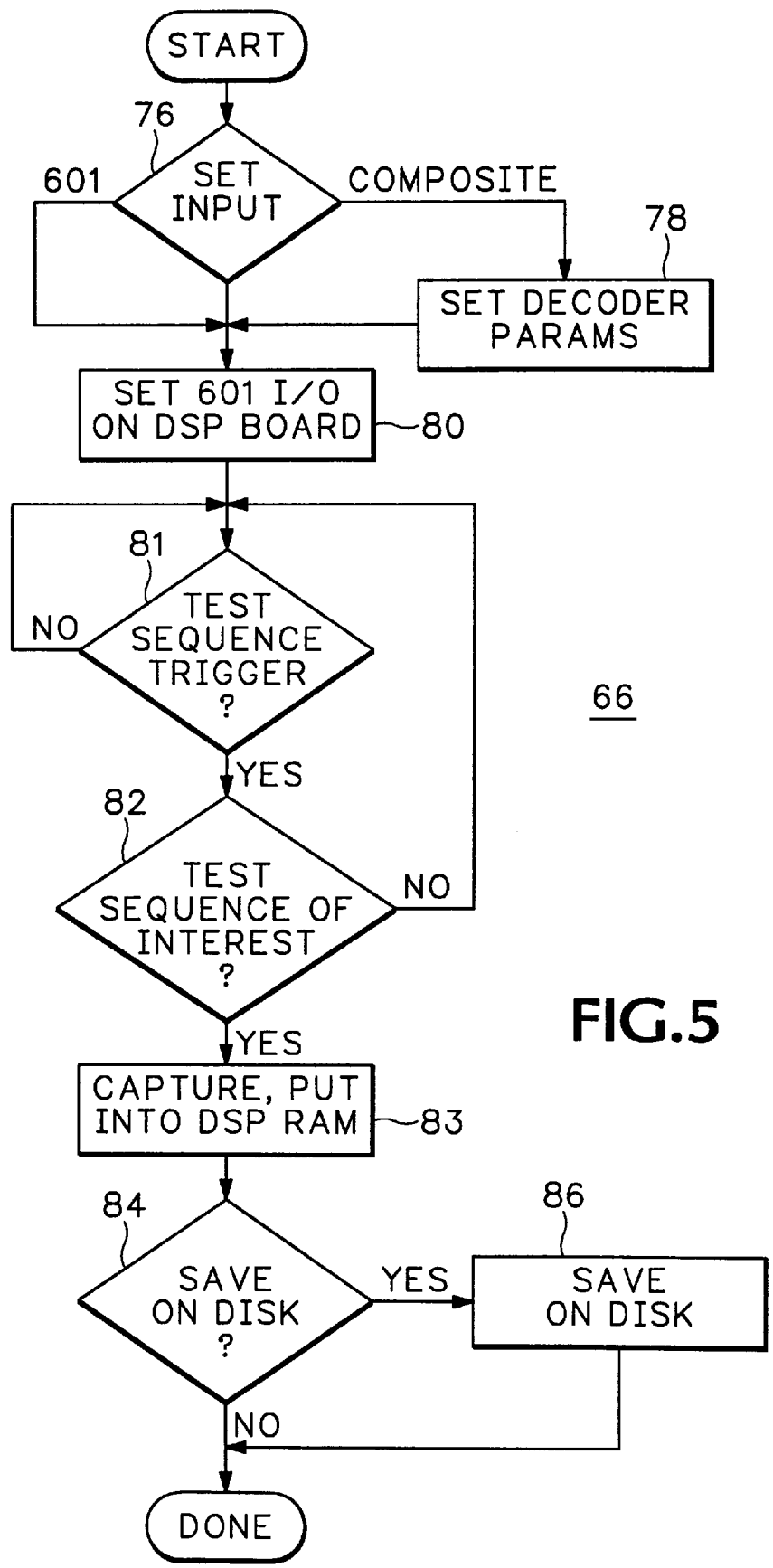
FIG. 5 is a flow chart diagram view of a capture process according to the present invention.

The capture step 66 is shown further in FIG. 5 where the input video is tested at step 76 to determine whether the input video is composite or serial digital. If the input video is composite, decoder parameters are set in step 78 to convert it to serial digital. The serial digital input/output on the capture board 30 is set up and a test sequence trigger is searched for at step 80 in the input video. When a test sequence trigger is detected at step 81 the sequence is checked at step 82 to determine whether it is one that is being used for the current test for which the instrument was set up in step 62. If it is the proper test sequence, then one or more frames are captured in the RAM on the capture board 30 at step 83. At step 84 the operator input is checked to see whether the captured video is to be saved on disk, and if so the video is stored at step 86, completing the capture step 66.

Figure 6:
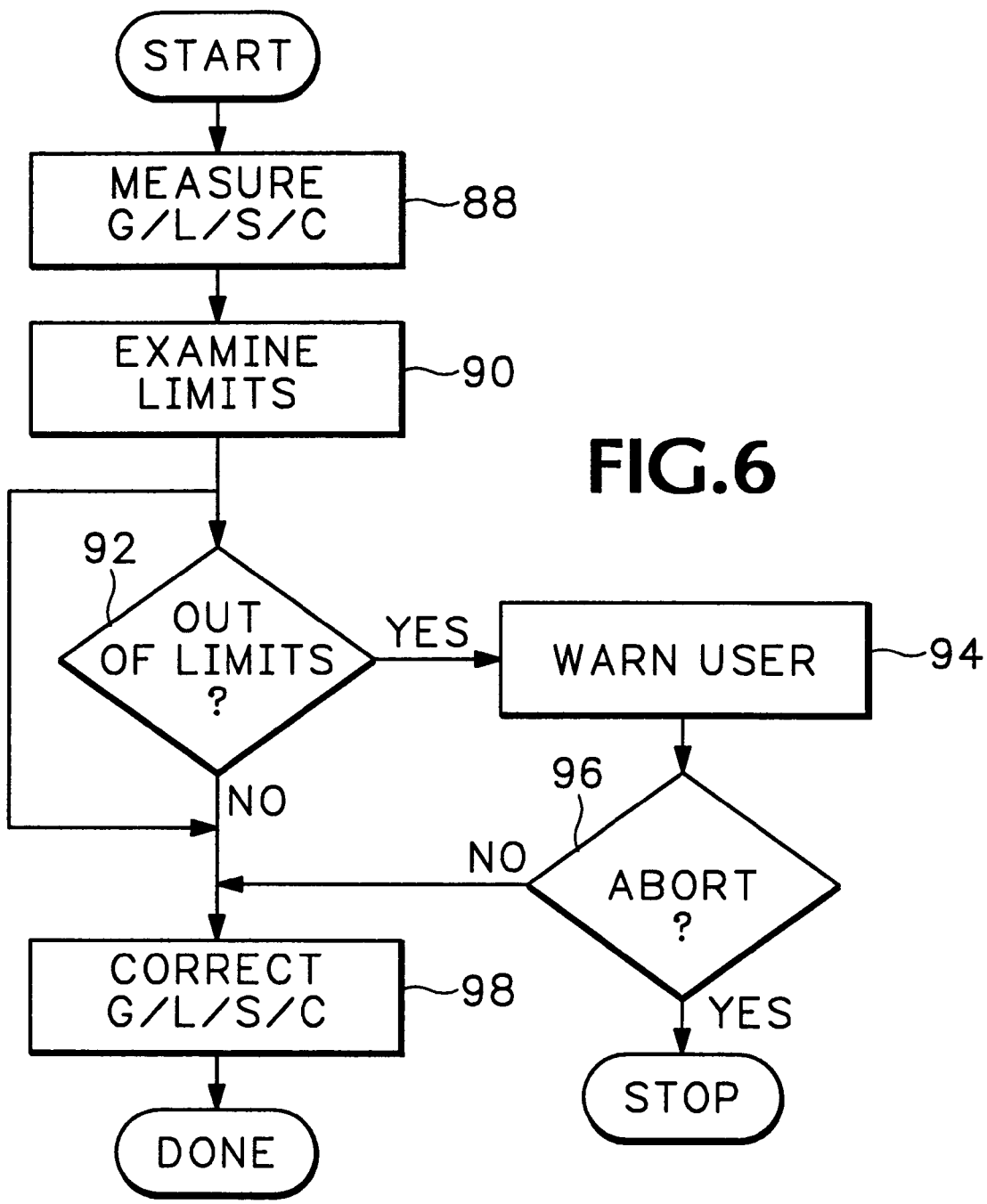
FIG. 6 is a flow chart diagram view of a pre-processing flow according to the present invention.

The pre-process step 68 is shown in greater detail in FIG. 6. Various measurements, such as gain, etc., are performed at step 88. The resulting measurements are compared with specified limits at step 90. A test is made at step 92 to determine whether the measured value is within limits, if enabled during the setup step 62. If an out of limits situation is detected, a warning is given to the operator at step 94, and the user at step 96 indicates whether or not to abort the measurement. If there is no abort, the measurement values are corrected in step 98 to conform to the limits.

Figure 7:
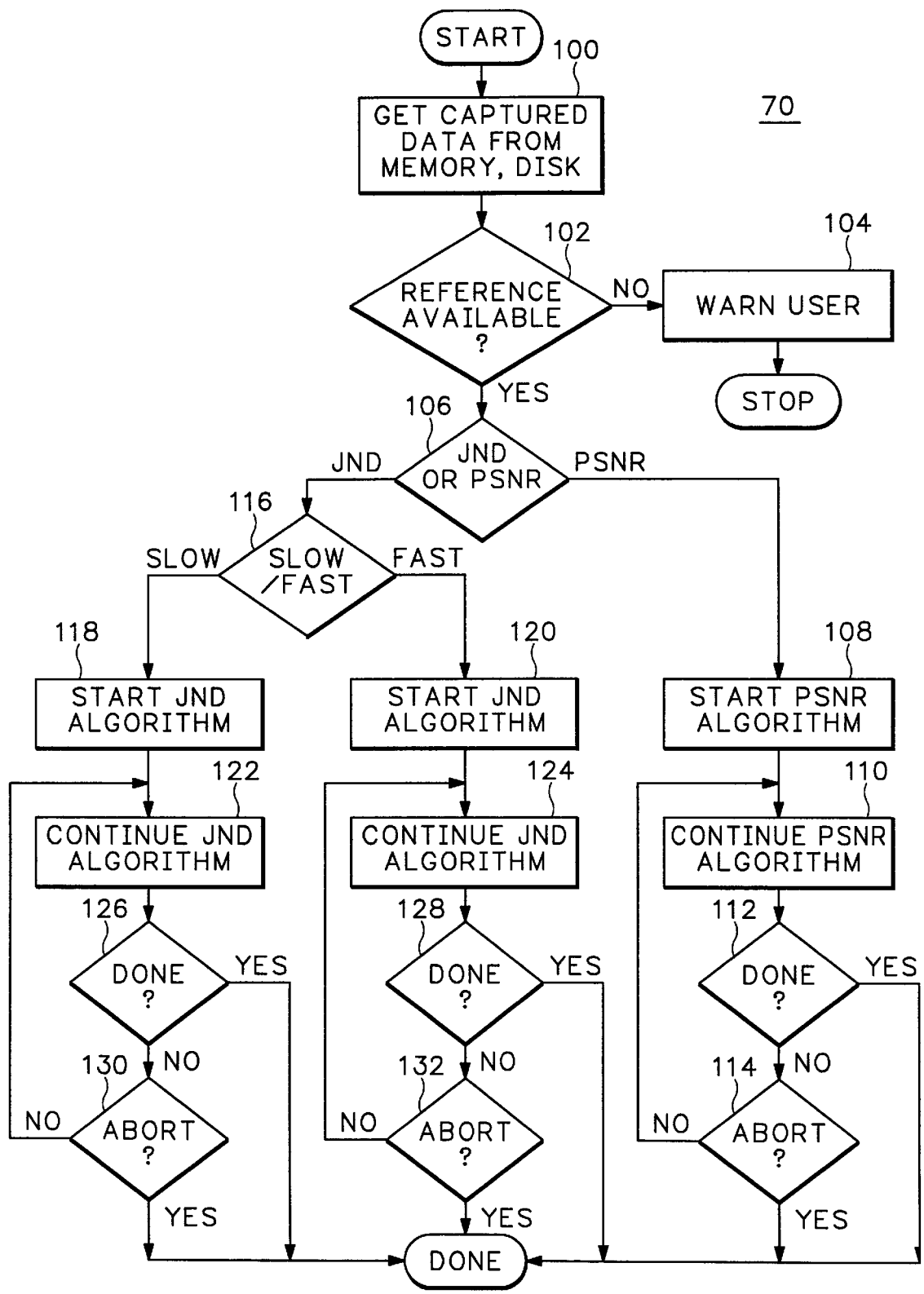
FIG. 7 is a flow chart diagram view of a measurement performance according to the present invention.

The measurement step 70 is also shown in greater detail in FIG. 7. Captured video is retrieved from memory or disk at step 100. The memory is then checked to see if a reference video is available at step 102. If no reference is available, the operator is alerted at step 104 and the measurement sequence stops. Otherwise the type of measurement to be performed, as established during the setup step 62, is determined at step 106. For example there may be two types of measurements that the instrument can perform, a just noticeable difference (JND) measurement or a power signal to noise ratio (PSNR) measurement. For the PSNR measurement the algorithm is initiated at step 108 and then continued in an iterative manner at step 110. After each loop through the PSNR algorithm a test is made to determine at step 112 whether the algorithm is done. If the algorithm is not done, then an abort step 114 checks to see whether the algorithm should be aborted before continuing to the next loop.

The JND measurement starts with a test as to whether a slow or fast version of the JND algorithm is desired at step 116. Regardless of the version of the algorithm chosen, the algorithms are initiated at steps 118, 120, continued iteratively at steps 122, 124, checked for completion at steps 126, 128, and checked for abort status at steps 130, 132 in the same manner as the PSNR algorithm process.

Figure 8:
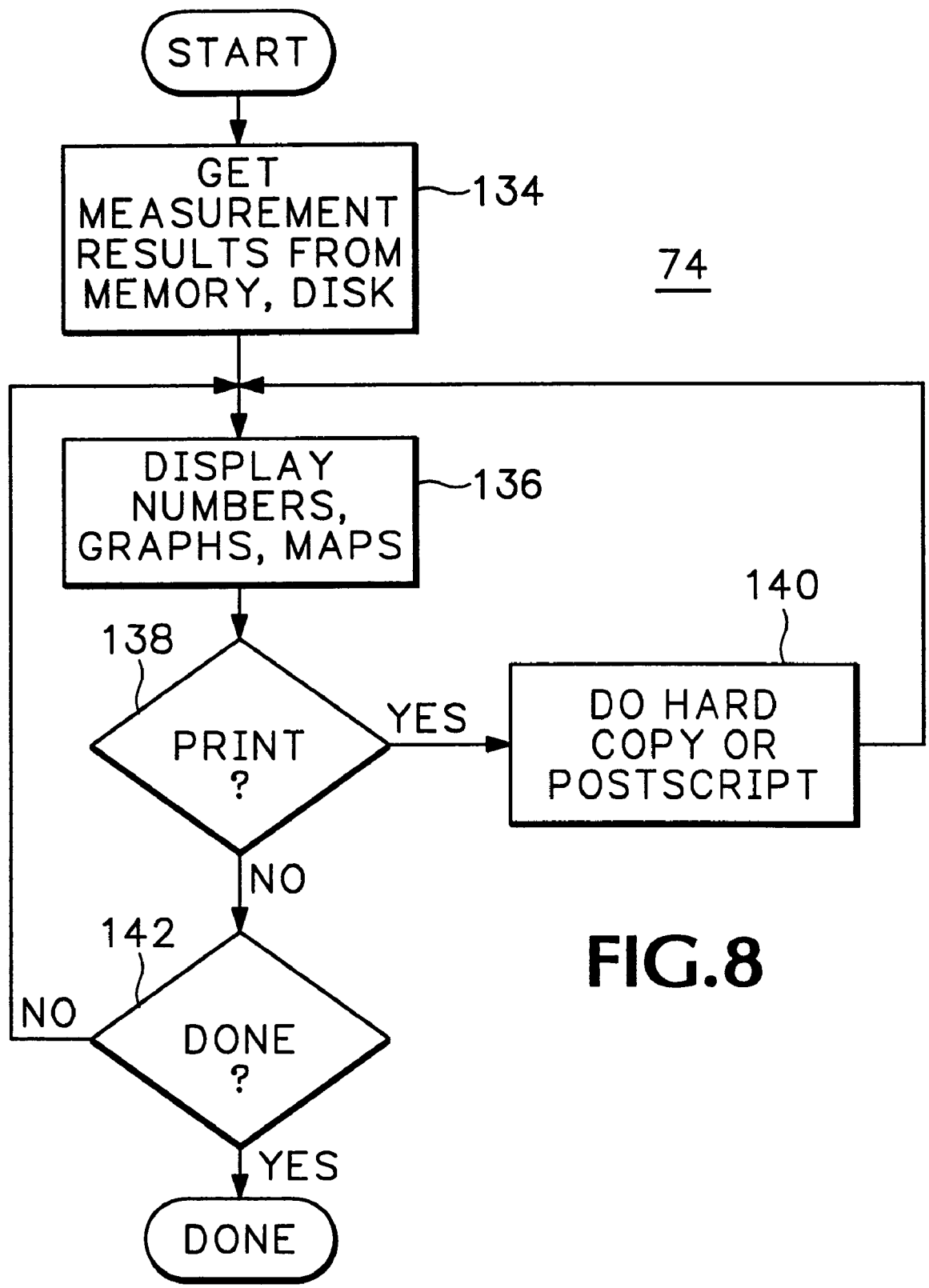
FIG. 8 is a flow chart diagram view of a results display process according to the present invention.

At the conclusion of the measurement step 70 as shown in greater detail in FIG. 8 the measurement results are accessed at step 134 and displayed at step 136 as numbers, graphs and/or maps according to the type of measurement and desired output display established during the setup step 62. The displayed results may be printed if enabled at step 138, either in hard copy form or as a postscript file per step 140. If the display step is completed per step 142, the measurement is complete. Otherwise additional measurements are retrieved for display.

For the JND and PSNR algorithms those pixels that fall within the highly attentional areas 14A, 16A have a low measurement threshold for errors, those within the penumbra 18 have a slightly higher threshold for errors, those within the general figure area 10A have yet a higher threshold for error, and those in the background 12 have a high threshold for error. These thresholds are incorporated into the algorithms to give greater weight to those areas within the image of greater attentional interest to an observer. Therefore the subjective measurement is captured by the attentional map, while the objective measurement uses the resulting weights to provide the final objective measurements for display.

Thus the present invention provides attentional maps in objective measurement of video signal degradation that emphasize those portions of the video signal that are subjectively important to an observer.

We claim:

1. A method of measuring video quality degradation comprising the steps of:

generating an attentional map for each image of a test image sequence;

capturing a video image sequence corresponding to the test image sequence after it has been processed by a system under test; and comparing the test image sequence with the video image sequence with the results being weighted in accordance with the corresponding attentional maps to provide a measurement display.

2. The method as recited in claim 1 further comprising the steps of:

initially selecting a measurement type from among a set of measurements that determines the results to be displayed as part of the measurement display; and preprocessing the video image sequence according to the selected measurement type prior to the comparing step.

3. The method as recited in claim 2 wherein the preprocessing step comprises the steps of:

performing specified measurements on the video image sequence to obtain measurement values according to the selected measurement type;

testing the measurement values against limits to determine whether an out of limits situation is present; and providing a warning if the out of limits situation is present.

4. The method as recited in claim 2 wherein the capturing step comprises the steps of:

converting the video image sequence to serial digital if input in a composite format;

searching for a test sequence trigger within the video image sequence;

verifying that the test sequence trigger corresponds to the selected measurement type; and storing a frame of the video image sequence in a storage device.

5. The method as recited in claim 4 wherein the comparing step comprises the steps of:

retrieving the captured frame from the storage device;

checking to see whether a comparable reference frame is available; and performing the measurement type using the captured frame and the comparable reference frame together with the corresponding attentional map to provide the measurement display.

6. An instrument for measuring video quality degradation comprising:

means for storing an attentional map for each image of a test image sequence;

means for capturing a video image sequence corresponding to the test image sequence after the test image sequence has been processed by a system under test; and means for comparing the test image sequence with the video image sequence with the results being weighted in accordance with the corresponding attentional maps to provide a measurement display.

* * * * *